United States Patent

Knowles et al.

[15] 3,686,415
[45] Aug. 22, 1972

[54] N-ACETYLCYCLOHEXYLAMINE REPELLANTS AND METHOD OF USE

[72] Inventors: Richard N. Knowles, Hockessin, Del.; Wilfred J. Arthur, Charleston, W. Va.

[73] Assignee: E. I. du Pont de Nemours and Company, Wilmington, Del.

[22] Filed: Oct. 28, 1968

[21] Appl. No.: 773,364

[52] U.S. Cl. ................................................. 424/320
[51] Int. Cl. .......................... A01n 9/20, A01n 23/00
[58] Field of Search ..................................... 424/320

[56] References Cited

FOREIGN PATENTS OR APPLICATIONS 782,789   9/1957   Austria

*Primary Examiner*—Benjamin R. Padgett
*Attorney*—Herbert W. Larson

[57] ABSTRACT

Repelling animals with N-acylcyclohexylamines of the formula:

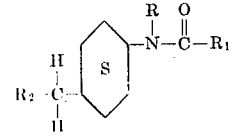

wherein
R is hydrogen, methyl or ethyl;
$R_1$ is hydrogen or alkyl of one through four carbon atoms; and
$R_2$ is cyclobutyl, cyclopentyl, cyclohexyl, cycloheptyl, cyclooctyl, cyclononyl, bicycloalkyl, cycloalkylalkyl or tricycloalkyl.

Typical are N-acetyl-cis-4-cyclobutylmethylcyclohexylamine and N-acetyl-cis-4-cyclohexylmethylcyclohexylamine useful for repelling animals.

10 Claims, No Drawings

W-ACETYLCYCLOHEXYLAMINE REPELLANTS AND METHOD OF USE

CROSS REFERENCE

This application is a divisional of our copending application Ser. No. 635,305, filed Apr. 20, 1967, which is a continuation-in-part of our application Ser. No. 532,544, filed Mar. 1, 1966.

BACKGROUND OF THE INVENTION

Compounds of this invention are cis isomer homocyclic organics having utility as animal repellants.

Whitman U.S. Pat. No. 2,511,028 teaches the acetyl derivative of trans-4-cyclohexylmethylcyclohexlamine which has little utility as an animal repellant

SUMMARY OF THE INVENTION

This invention relates to N-acetylcyclohexylamines.

More specifically, this invention refers to N-acyl-4-cycloalkyl-, bicycloalkyl-, and tricycloalkyl- substituted-cyclohexylamines, compositions containing them and methods of applying them to animals.

Potent animal inhalation irritant effects are achieved by applying to animals or their habitat, compounds of the formula:

(1) 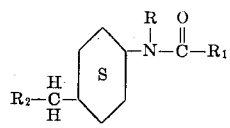

wherein
R is hydrogen, methyl or ethyl;
$R_1$ is hydrogen or alkyl of one through four carbon atoms; and
$R_2$ is cyclobutyl, cyclopentyl, cyclohexyl, cycloheptyl, cyclooctyl, cyclononyl, cycloalkylalkyl of five through 10 carbon atoms, bicycloalkyl of seven through 10 carbon atoms, and tricycloalkyl of 10 through 11 carbon atoms.

Substitutions on the cyclohexyl ring must be in the cis configuration to obtain optimum irritant effects.

Preferred because of high irritant activity at low rates and good residual effects are N-formyl and N-acetyl-cis-4-cyclohexylmethylcyclohexylamine, N-acetyl-cis-4-cyclobutylmethylcyclohexylamine and N-acetyl-cis-4-(2-[2.2.1]-bicycloheptylmethyl)cyclohexylamine.

UTILITY

Compounds of this invention cause potent irritation to animal tissue, particularly to the mucous membranes.

Animals exposed to the above compounds show signs of severe respiratory irritation and are quickly incapacitated. These compounds have two advantages over currently used riot control agents such as ortho-chlorobenzylidenemalononitrile (CS) and 2-chloroacetophenone (CN). One, the compounds are more potent at low concentrations and two, they provide residual activity over longer periods of time.

Compounds of this invention and particularly N-acetyl-cis-4-cyclohexylmethylcyclohexylamine and N-acetyl-cis-4-cyclobutylmethylcyclohexylamine have potential use as riot control agents, dog repellants, deer repellants, rodent repellants and as contaminating agents for caves or underground tunnels.

PREPARATION

The compounds of this invention where $R_2$ is cyclohexyl can be prepared using 4-benzoylbenzoic acid as the starting material. A Wolf-Kishner reduction of 4benzoylbenzoic acid gives high purity 4-benzylbenzoic acid in high yields. This reaction is illustrated as follows:

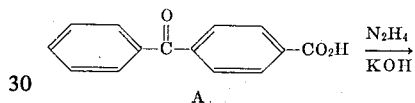

A.

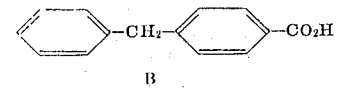

B

The reduction of 4-benzylbenzoic acid (B) with Adam's Catalyst gives a high yield of 4-cyclohexylmethylcyclohexanecarboxylic acid (C) containing 75 to 80 percent of the acid in the cis configuration and 20 to 25 percent of the acid in the trans configuration. This acid is a useful intermediate for preparing the compounds of this invention. This reaction is illustrated below.

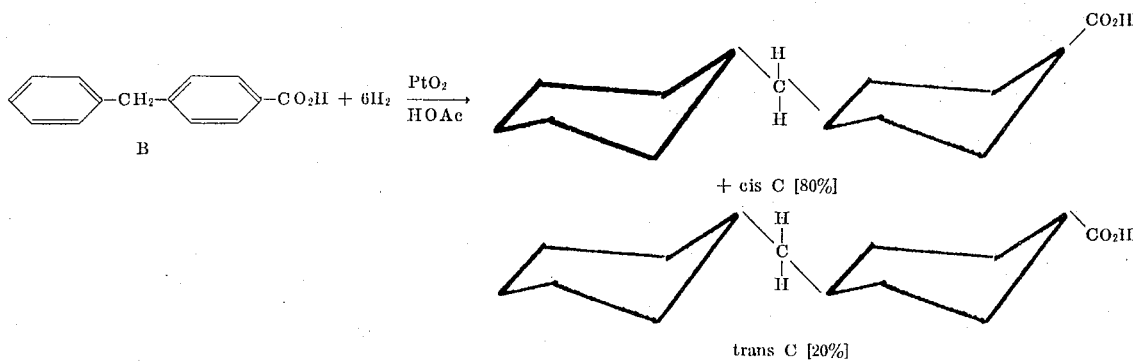

The cis, trans mixture of (C) above is converted by the Schmidt reaction to 4-cyclohexylmethylcyclohexylamine D below and isolated and stored as the hemisulfate salt. This latter compound contains the same cis/trans ration that was present in the mixture of (C) above. This reaction is illustrated below using cis C only since this leads to the desired isomer.

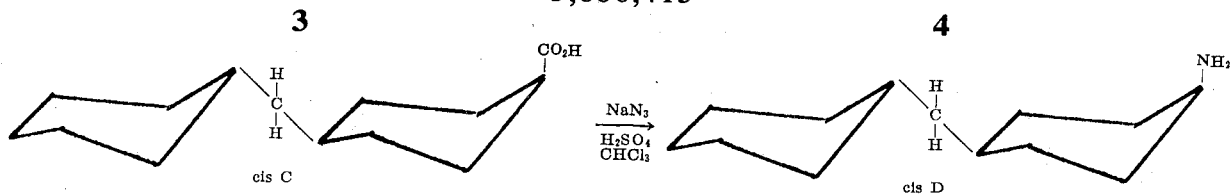
Compound (D) is then converted into the desired amide (E) by treatment either with the appropriate aliphatic anhydride or the appropriate acid chloride. These reactions are illustrated as follows:
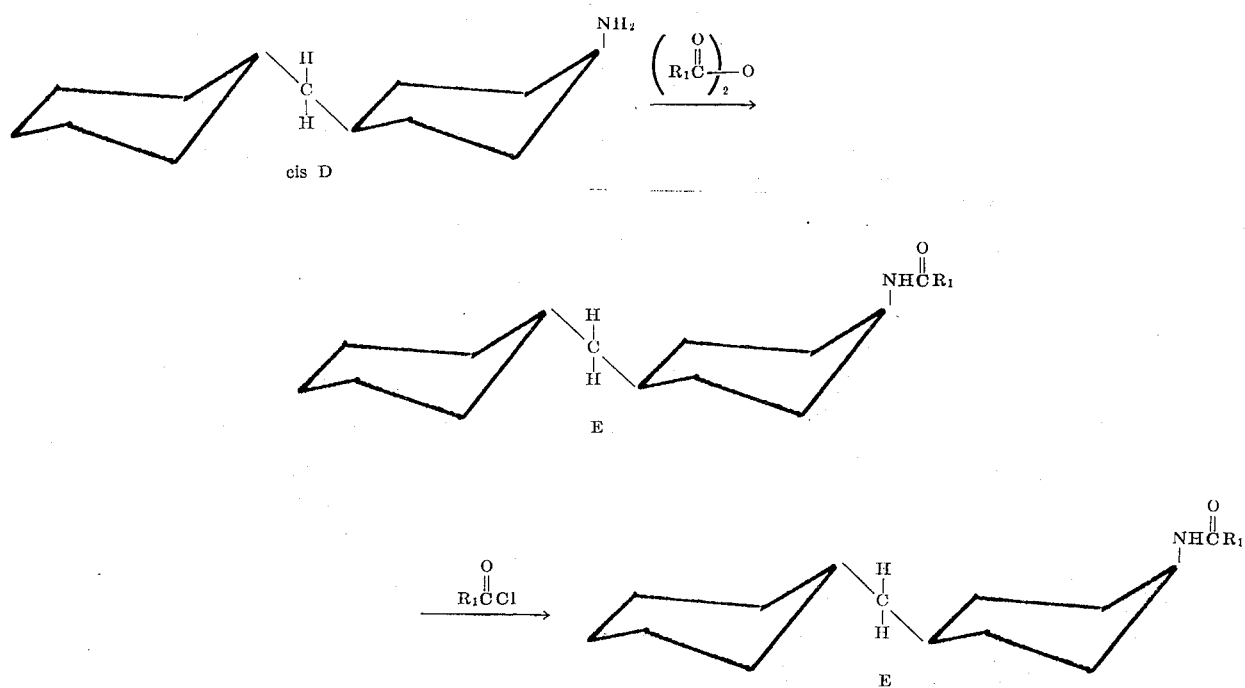
$R_1$ is alkyl of one through four carbon atoms.
If $R_1$ is to be hydrogen, (D) can be refluxed for one hour with formic acid as illustrated below.
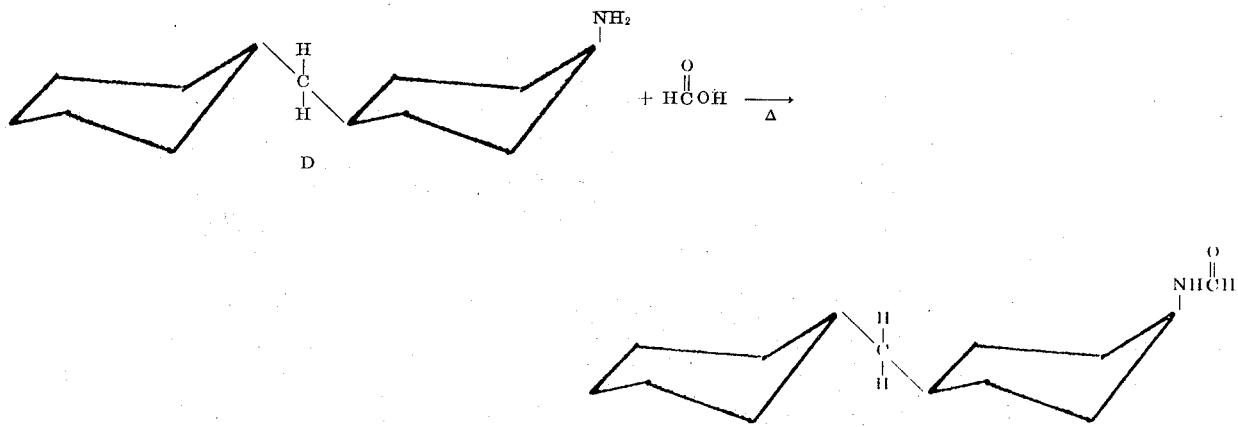

If R in the formula (1) is to be alkyl, (D) is treated with formaldehyde or acetaldehyde and then the imine is reduced with lithium aluminum hydride to give the N-alkyl-4-cycloyexylmethylcyclohexylamine (F). This amine is then acylated to give the desired amide (G). This reaction sequence is illustrated below.

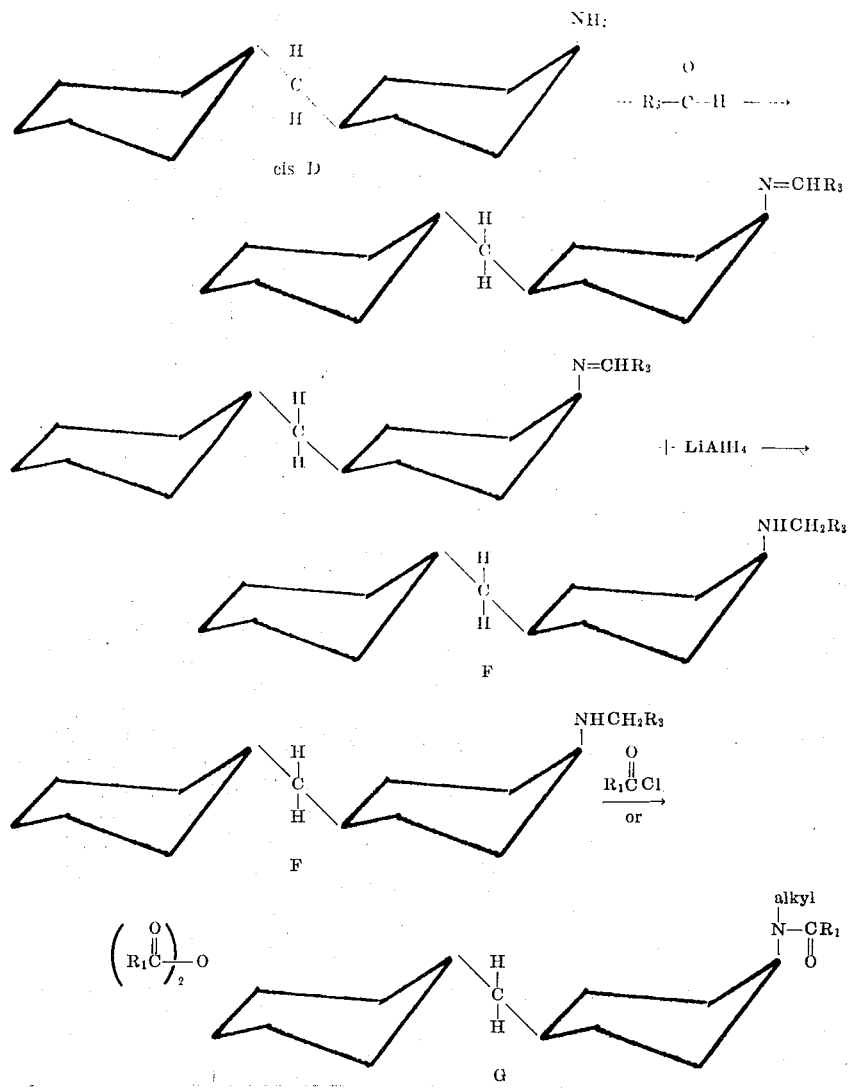

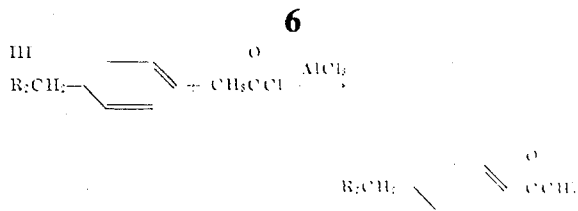

$R_1$ has the same meaning as above and $R_3$ is hydrogen or methyl.

Compounds (F) and (G) are obtained in the pure form by chromatography of the cis/trans mixtures over silicic acid using methylcyclohexane saturated with acetonitrile as the eluting solvent.

A more general method of preparing the compounds of this invention is illustrated by the following synthetic route:

R, $R_1$ and $R_2$ in the following reactions are as defined above in formula (1).

I 

II 

IV 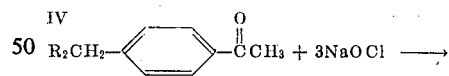

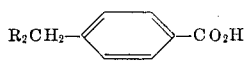

V 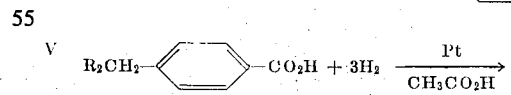

VI 

VII

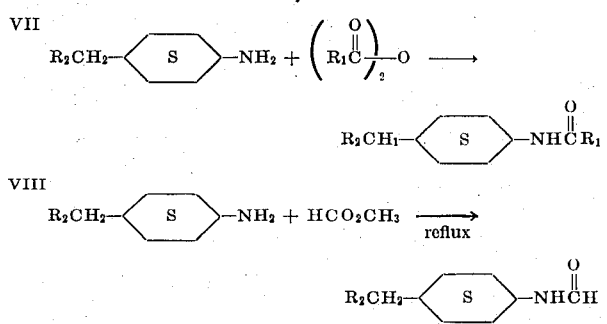

Those compounds where R is methyl or ethyl are prepared according to the following reactions where $R_1$ becomes R during reaction IX.

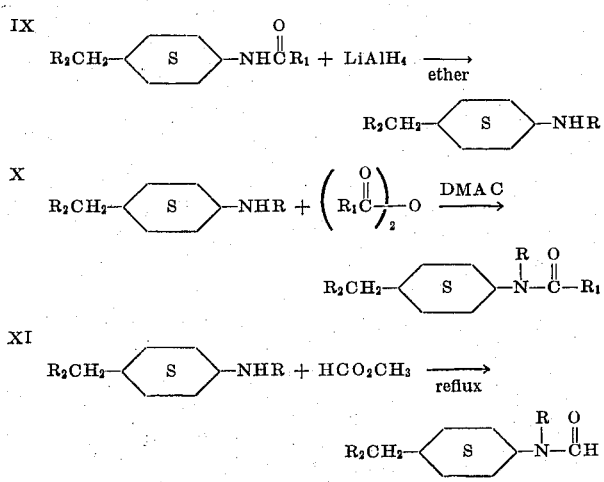

The Friedel-Crafts reaction (I) is run by carefully adding the acid chloride to a stirring mixture of aluminum chloride and benzene. A slight molar excess of catalyst is used; benzene serves as both a solvent and reactant. The acid chloride is added at such a rate so as to keep the temperature of the slurry at about 30°–40° C. The mixture is stirred for one additional hour after all of the acid chloride is added, and then water is slowly added to decompose the catalyst. Sufficient water is added so that all the solids are dissolved. The phenylalkyl ketone is isolated from the benzene solution and is purified by distillation.

The Wolff-Kishner reduction (II) is run in 2-(2-ethoxyethoxy)ethanol using a modification of the procedure given by J. Cason, et al. in Organic Synthesis, Collective Vol. IV, John Wiley and Sons, New York, (1963), p. 510. Once the reactants are mixed, they are heated to reflux for a period of three to five hours. The reflux temperature is generally in the 130°–140° C. range. After completion of the reflux period, the solution is cooled and poured into three to four volumes of water. The alkylbenzene product is extracted with pentane and purified by distillation.

The Friedel-Crafts reaction (III) is run by mixing approximately equimolar quantities of the reactants together in hexane or nitromethane at less than 5° C. The stirring mixture is slowly allowed to warm to room temperature, and when hydrogen chloride evolution subsides, the mixture is refluxed several hours. Water is then added slowly to decompose the catalyst. A sufficient quantity of water is then added so that all of the solids are dissolved. The desired acetophenone derivative is isolated from the organic phase, and purified by distillation. Gas-liquid chromatography on an F & M Model 500 Gas Chromatographer using a 2 foot × ¼ inch O.D. stainless steel column, containing 10 percent Carbowax 20M on 60–80 mesh Diatoport T indicates that about 98 percent of the acetophenone is the 1,4 isomer and 2 percent is the 1,2 isomer. The 1,2 isomer has the shorter retention time.

The haloform reaction (IV) is run by slowly adding a cold (<5° C.) sodium hypochlorite solution to a stirring solution of the acetophenone derivative in methanol. This is a modification of the procedure used by E. E. Royals (J. Am. Chem. Soc., 69, 841 (1947) for the haloform reaction of α-ionone. After the sodium hypochlorite solution is added, the mixture is warmed to room temperature, and left standing over night. Thereafter, the mixture is heated to reflux, and the distillate collected until the pot temperature rises to 95°–97 C.; most of the methanol is distilled. The pot is then cooled to room temperature. In those reactions where $R_2$ has a low molecular weight such as cyclobutyl, the sodium benzoate derivative remains dissolved; however, if $R_2$ is larger such as cycloheptyl, the sodium benzoate derivative precipitates as a soapy solid. Sulfur dioxide is bubbled into the alkaline pot concentrate until the pH drops below 3. The precipitated benzoic acid derivative is either filtered and washed with water, or extracted with methylene chloride depending on whether or not the benzoic acid is easily filterable or is of a soapy nature. Some of these benzoic acid derivatives can be recrystallized from acetonitrile or pentane, and some are purified merely by trituration with cold pentane.

The catalytic hydrogenation (V) is performed at two to three atmospheres of hydrogen using platinum oxide as catalyst and glacial acetic acid as solvent. A Parr Hydrogenation Apparatus is suitable for these reactions. This reaction produces a cis/trans isomer mixture of about 2 or 3:1.

The Schmidt reaction (VI) is performed by dissolving the cyclohexane carboxylic acid derivative in a mixture of chloroform and concentrated sulfuric acid. Sodium azide is then added in small portions to the stirring mixture at a rate sufficient to keep the reaction temperature between 35° and 45° C. The mixture is stirred at about 45° to 50° C. until the bubbling nearly stops (1 to 3 hours). The mixture is then transferred to a separatory funnel, and the lower, gelatinous sulfuric acid layer is slowly dripped onto ice. The amine sulfate precipitates as a soapy material which slowly crystallizes. The chloroform should be kept away from the ice water mixture since it makes the work-up much more difficult. Those amines which crystallize as the hemisulfates or sulfates are filtered and washed with water. It is convenient to store these amines as their salts. Those amine salts which fail to crystallize are converted to the free bases by making the sulfuric acid solution alkaline, and extracting the amine with dichloromethane. The amine is then purified by distillation. The Schmidt reaction proceeds without changing the cis/trans product ratio.

The acylation (VII) can be performed by dissolving the free amine in an equal volume of dimethylacetamide (DMAC) or dimethylformamide (DMF) and adding an excess of the desired acid anhydride to the stirring solution. This reaction is very exothermic. The solution is stirred for ten minutes, and then it is poured into 10 to 100 volumes of water. The amide separates as an oil water which subsequently crystallizes.

The acylation (VII) can also be performed using the amine sulfate directly according to the following procedure. The amine sulfate is ground into a powder, and added to a 1:1 mixture of DMAC and 20 percent aqueous sodium hydroxide solution; there should be a large excess of base. The mixture is stirred for 10 to 15 minutes, and then an excess of the desired acid anhydride is added. The mixture warms to about 60° to 65° C. The sulfate entirely dissolves in 10 to 20 minutes. The solution is then poured into 10 to 100 volumes of water. The amide is isolated by the usual procedures given above.

The formamides of reaction VIII are prepared by refluxing the the amine with methylformate for several hours. The excess methylformate is stripped from the reaction, and the residual formamide is purified by recrystallization.

These acylations proceed without changing the cis/trans product ratio.

In those cases where R is methyl or ethyl, the formamide or acetamide respectively is reduced by lithium aluminum hydride in refluxing ether according to reaction IX. The amine is isolated from the reaction after the lithium aluminum hydride is destroyed. The amines are purified by distillation.

Reactions X and XI are run according to the procedures described for reactions VII and VIII respectively.

An alternative synthesis route can be used when the appropriately substituted aniline derivatives are available. This route is illustrated below.

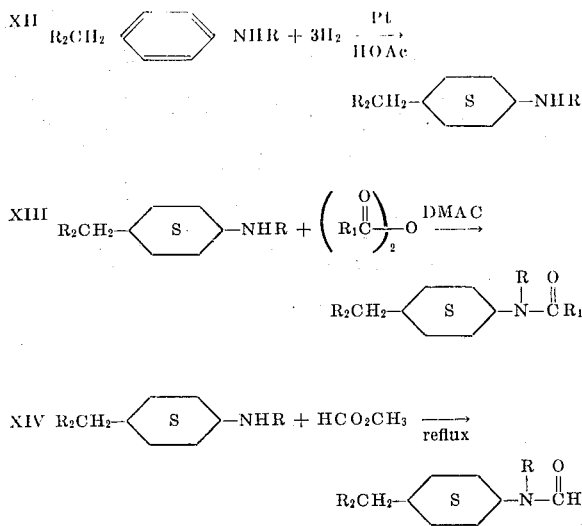

The hydrogenation (XII) can be performed at 1 to 3 atmospheres of hydrogen on a Parr Hydrogenation Apparatus using platinum oxide as catalyst and glacial acetic acid as solvent. Hydrogen up-take is quite slow.

The cis:trans ratio of the cyclohexylamine product is about 1:1.

Reactions XIII and XIV are performed according to reactions VII and VIII discussed above. The cis:trans ratio for the amides from XII and XIII is about 1:1.

The amides from reactions VII, VIII, X, XI, XIII and XIV can be used for the purposes of this invention without separation of the cis and trans isomers. However, if desired, the pure amide isomers can be separated by chromatography over silicic acid using methylcyclohexane saturated with acetonitrile as the eluting solvent. Isomer mixtures also can be separated by gas-liquid chromatography using 10 percent Carbowax 20M on 60–80 mesh Diatoport T. In both of these chromatography methods, the cis isomer elutes before the trans isomer.

COMPOSITIONS

Compounds of this invention can be administered alone, but are generally contained in a composition with an inert diluent non toxic to animals. The diluent selected depends on the route of administration.

Emulsifying agents can be used with the diluent and compound of formula (I) to aid in dispersion of the active ingredient. Emulsifying agents that could be used include alkylaryl polyethoxy alcohols, alkyl and alkylaryl polyether alcohols, polyoxyethylene sorbitol or sorbitan fatty esters, polyethylene glycol fatty esters, fatty alkylol amide condensates, amine salts of fatty alcohol sulfates plus long chain alcohols and oil soluble petroleum sulfonates.

The amount of emulsifying agent in the composition will range from 0.1 to 20 percent by weight.

Since the compounds of the present invention would generally be administered by vapor or spray application, the compositions will contain a liquid diluent such as water, acetone, hexane, gasoline, kerosene, other hydrocarbon oils, alcohols or other liquid generally used in pharmaceutical preparations.

The amount of active ingredient in the composition will vary from 0.005 percent by weight to 95 percent or even higher. However, the diluent will generally constitute the major proportion of the composition and the amount of active ingredient will be less than 50 percent by weight. The exact concentration of the active ingredient will depend on the mechanism used for administration and will be easily understood by one knowledgeable in pharmaceutical application rates.

APPLICATION

A quantity of active ingredient sufficient to cause irritation to animal tissue is 1 to 4,000 micrograms per liter of air at exposure of one minute. A quantity of 5 to 4,000 micrograms per liter of air at exposure of one minute is preferred. Rates of over 4,500 micrograms per liter of air at exposure of five minutes kills 50 percent of the mice which are treated.

The following additional examples are provided to more clearly illustrate the invention.

EXAMPLE 1

Sixty grams of potassium hydroxide is dissolved in 200 ml. of diethyleneglycolmonoethylether by cautiously heating the mixture to 150°–200° C. the solution is cooled to 100° C., and 50 grams of 4-benzoylbenzoic acid and 40 ml. of 99 percent hydrazine hydrate are added. The mixture is gradually heated to reflux, (120°–30° C.) and refluxed for one hour. Then the distillate (≈75 ml.) is collected until the reflux temperature rises to 205°–210° C. This heating must be carefully performed because of foaming problems. The reactants are refluxed at 205°–210° C) This heating must be carefully performed because of foaming problems. The reactants are refluxed at 205°–210° C. for 2 hours and the solution is cooled to 100° C.

The hot solution is poured into 500 ml. of water. The solution then is treated with 10 percent aqueous hydrochloric acid until the pH is 1–2. The solids which precipitate are filtered and washed with water, m. 158.5°–159.0° C. The yield is 45 grams of 4-benzylbenzoic acid (96 percent of theory).

A mixture of thirty-one and eight tenths grams of 4-benzylbenzoic acid (III) (0.150 mole) and one gram of platinum oxide in 250 ml. of glacial acetic acid is treated with hydrogen in a Parr Apparatus at room temperature. The reduction requires a 75 psig (12 mmole/pound) drop in hydrogen pressure. The initial hydrogen pressure is set at 45 psig. and the reaction is run over night. The pressure is reset to 45 psig. and the reaction is run until the hydrogen up-take stops. Complete hydrogenation is required because of the difficulty of separating any partially reduced products. After the required amount of hydrogen has been absorbed the platinum is filtered and the acetic acid is stripped under reduced pressure on a steam bath. The residue is taken up in ether and washed several times with water to remove the last of the acetic acid. The ethereal solution is dried ($MgSO_4$), filtered and stripped leaving white crystals of 4-cyclohexylmethylcyclohexanecarboxylic acid, m. 60°–64° C. from pentane.

Calc'd. for $C_{14}H_{24}O_2$: C, 74.9; H, 10.8%.

Found: C, 75.2; H, 10.7%.

To a solution of 29.6 grams (0.132 mole) of 4-cyclohexylmethylcyclohexanecarboxylic acid in 160 ml. of chloroform, 80 ml. of concentrated sulfuric acid is added. The mixture is stirred, and 11.7 grams (0.180 mole) of sodium azide is slowly added. The rate of addition maintains the reaction temperature below 50° C. The gas evolution becomes quite vigorous at 32°–35° C. The addition requires one to two hours. The reactants are then stirred for an additional one hour at 45°–50° C. or until gas evolution ceases. The mixture is transferred to a separatory funnel and the lower, gelatinous, sulfuric acid layer is dripped into 500 grams of ice. It is important to keep the chloroform away from this mixture because the sulfate salt is soluble in chloroform. The sulfate salt which precipitates is oily at first but gradually crystallizes. The crystals are filtered and washed with water. The yield if 80–90 percent of 4-cyclohexylmethylcyclohexylamine hemi-sulfate; m. 300° C.

Nineteen grams of 4-cyclohexylmethylcyclohexylamine hemi-sulfate (0.039 mole) is shaken with a mixture of 5 percent aqueous sodium hydroxide solution (150 ml.) and ether (150 ml.). The salt slowly dissolves. The alkaline solution is washed with 2 × 150 ml. of ether, and then the combined ethereal solutions are back-washed with 1 × 100 ml. of 5 percent aqueous sodium hydroxide solution. The ethereal solution is dried ($MgSO_4$), filtered and stripped leaving 9.6 grams of the amine. The amine is taken up in 20 ml. of dimethylacetamide, and 5 ml. of acetic anhydride is added with stirring. The temperature of the solution rises to ≈80° C. immediately after the addition. The reactants are stirred for 5 minutes and then poured into 500 ml. of cold water. The oil which separates is crystallized, filtered and washed with 3 × 200 ml. of water. The solids are recrystallized from hexane to give N-acetyl-cis-4-cyclohexylmethylcyclohexylamine. The yield is 9.5 grams (51 percent of theory), m. 94°–107°. Gas-liquid chromatography shows that the cis/trans ratio is 82/18.

A 15 grams sample of a 75/25 cis/trans mixture is passed over a 5 × 40 cm. column of silicic acid (450 grams) using methylcyclohexane saturated with acetonitrile as eluent. A 4.5 gram sample of pure N-acetyl-cis-4-cyclohexylmethylcyclohexylamine is isolated, m. 113.8°–114.6°.

Calc'd. for $C_{15}H_{27}NO$: C, 75.9; H, 11.5; N, 5.9%.

Found: C, 75.8; H, 11.1; N, 5.6%.

The infrared spectrum shows its characteristic bands at 3,400 cm$^{-1}$, 1,640$^{-1}$, 1,550 cm$^{-1}$ and 1,290 cm$^{-1}$.

Mice are treated by aerosol exposure to the N-acetyl-cis-4-cyclohexylmethylcyclohexylamine in the following manner: The compound is administered as an aerosol into a 2.8 liter chamber. The exposure chamber consists of a 2.8 liter bell jar over a nebullizer inserted through the floor of the chamber. Mice are exposed for 5 minutes to 200.0 micrograms per liter (1,000 Ct). The compound is dissolved in acetone and during a span of 20 seconds the compound is sprayed up into the chamber. No further air is transferred into or out of the chamber during the five minute exposure.

After this exposure, irritant activity is observed in all mice exposed, but not in controls exposed to 1.4 of acetone alone. Irritant activity can be described as the presence of one or more of the following reactive signs:

a. hyperemia of the ears, nose and tail
b. abnormal gait, including rubbing of the nose on the floor while running about
c. blinking
d. salivation
e. depression
f. dyspnea
g. hunched posture
h. face-pawing.

EXAMPLES 2–4

The following compounds are made in the manner of the N-acetyl-cis-4-cyclohexylmethylcyclohexylamine of Example 1 by substituting like molar amounts of the appropriate starting materials. The compounds are formulated and applied in like manner to provide the results:

2. N-Methyl-N-acetyl-cis-4-cyclohexylmethylcyclohexylamine.
3. N-Butyryl-cis-4-cyclohexylmethylcyclohexylamine.
4. N-Formyl-cis-4-cyclohexylmethylcyclohexylamine.

EXAMPLE 5

Three grams of 4-cyclohexylmethylcyclohexylamine sulfate is liberated from its salt as in Example 1 and is treated with 2 ml. of butyrylchloride in 10 ml. of pyridine. After having been stirred for one-half hour, the solution is poured into water. The oil which separates crystallizes and is filtered and washed with water leaving a white solid, N -butyryl-cis-4-cyclohexylmethylcyclohexylamine, m. 83°–87°. The cis/trans product ratio is about 80/20.

EXAMPLE 6

Ten grams of 4-cyclohexylmethylcyclohexylamine sulfate and 50 ml. of formic acid are heated to 80°–100° C. for one hour. The reactants are then poured into 1 liter of water and the N-formyl-cis-4-cyclohexylmethylcyclohexylamine which separates is filtered and washed with water.

EXAMPLE 7

Dogs are exposed to vapors from N-acetyl-cis-4-cyclohexylmethylcyclohexylamine in acetone spotted on a 6 cm. circle of filter paper. The dog's head is held by an operator, and the dried paper is held 6 to 12 cm. from the muzzle. Within 10–30 seconds, the dog salivates, licks his lips, and occasionally face-paws. Generally he struggles, to escape further irritant effects. As little as 2 milligrams on paper can generate enough vapor at room temperature to cause visible discomfort in most dogs.

EXAMPLE 8

A test chamber, comprising a plastic rectangular box of 65 liters, is filled with an aerosol spray of N-acetyl-cis-4-cyclohexylmethylcyclohexylamine. The spray is administered 2 cm. above an immobilized rabbit, and 3 cm. distant from the end of the nose. The aerosol is aimed directly at the rabbit. Administration of compound takes approximately 1 minute. At 5,000 Ct (5 minutes), the rabbit exhibited lacrimation, nasal exudate, face pawing, and constant head shaking. After several minutes, the eyes became static after periods of blinking. Dyspnea continued for two hours after exposure.

EXAMPLES 9 – 13

The following compounds are formulated and applied in the manner of the N-acetyl-cis-4-cyclohexylmethylcyclohexylamine of Example 8. Like results are obtained.
  9. N-Proponyl-cis-4-cyclohexylmethylcyclohexylamine.
  10. N-Isobutyryl-cis-4-cyclohexylmethylcyclohexylamine.
  11. N-Formyl-N-methyl-cis-4-cyclohexylmethylcyclohexylamine.
  12. N-Acetyl-N-methyl-cis-4-cyclohexylmethylcyclohexylamine.
  13. N-Proponyl-N-methyl-cis-4-cyclohexylmethylcyclohexylamine.

EXAMPLE 14

A mixture consisting of 400 ml. of benzene and 67 g. (0.5 mole) of aluminum chloride is stirred in a one liter round bottom flask fitted with a stirrer, thermometer, condenser connected to a scrubber, dropped funnel, and cooling bath. Cyclobutane carbonyl chloride (50 g.; 0.42 mole) is added dropwise while the pot temperature is held below 35° C. The brown slurry is stirred for 1 hour and then water is cautiously added while the pot temperature is held below 30° C. Sufficient water is added so that all the solids dissolve. Two liquid phases are obtained. The mixture is transferred to a separatory funnel, and the benzene layer is separated. The aqueous layer is washed with 100 ml. of benzene which is then combined with the first benzene fraction. The aqueous solution is discarded. The combined benzene fractions are washed sequentially with 200 ml. of 5 percent aqueous sodium hydroxide solution and 250 ml. of water. The benzene solution is dried with magnesium sulfate, filtered, and evaporated in vacuum. The residual oil is distilled at 67° C. at 0.1 mm. of mercury giving cyclobutylphenylketone ($N_D^{25}$ 1.5455).
Anal. Calc'd. for $C_{11}H_{12}O$: C, 82.5; H, 7.6%.
Found: C, 81.9; H, 7.6%.

EXAMPLE 15–22

The following phenylketone derivatives are prepared according to the procedures given for cyclobutylphenylketone in Example 14 by substituting the appropriate molar amount of the acid chloride for the cyclobutane carbonyl chloride in example 14. The acid chlorides are either commercially available or easily prepared from the known acid with thionylchloride.
  15. 2-[2.2.1]-Bicycloheptylphenylketone: $B_{0.1}$ 98° C; $n_D^{25}$ 1.5556.
  16. cyclopentylphenylketone: $B_7$ 130°–134° C.; $n_D^{25}$ 1.5484.
  17. 3-Cyclopentylpropiophenone: $B_{0.4}$ 126° C.; $n_D^{25}$ 1.5300.
Anal. Calc'd. for $C_{14}H_{18}O$: C, 83.2; H, 8.9 percent.
Found: C, 83.1; H, 8.9 percent.
  18. Cycloheptylphenylketone: $B_{1.3}$ 134°–136° C.; $n_D^{25}$ 1.5415.
  19. 1-Adamantylphenylketone: m. 49°–52° C.
  20. 2-[2.2.2]-Bicyclooctylphenylketone.
  21. 1-[3.2.1]-Bicyclooctyplhenylketone.
  22. 2-[3.3.1]-Bicyclononylphenylketone.

EXAMPLE 23

A solution of potassium hydroxide (140g.; 2.5 mole) in 500 ml. of 2-(2-ethoxyethoxy)ethanol (from Matheson, Coleman & Bell Co.) is prepared by carefully heating the mixture until all of the solids are gone. The solution is cooled to below 100° C. Then 2-[2.2.1]-bicycloheptylphenylketone (94.7g.; 0.50 mole) and 99 percent hydrazine hydrate (110 g.; 2.2 mole) are added all at once. The reactants are refluxed for four hours at 135° C., and then the solution is poured into 2.5 l. of water. The oil which separates is extracted with three-500 ml. portions of pentane. The aqueous phase is discarded, and the combined pentane fractions are dried with magnesium sulfate, filtered and evaporated in vacuum. The residual oil is distilled at 120° C. at 12 mm. of mercury to give phenyl-2-[2.2.1]-bicycloheptylmethane ($n_D^{25}$ 1.5342).
Anal. Calc'd. for $C_{14}H_{18}$: C, 90.3; H, 9.7 percent.
Found: C, 90.8; H, 9.5 percent.

EXAMPLES 24 – 33

The following phenylmethane derivatives are prepared according to the procedure given for phenyl-2[2.2.1]-bicycloheptylphenylketone of Example 23.
  24. Cyclobutylphenylmethane: $B_{12}$ 89° C.; $n_D^{25}$ 1.5150.
  25. Cyclopentylphenylmethane: $B_4$ 92° C.; $n_D^{25}$ 1.5165.

26. 1-Cyclopentyl-3-phenylpropane: $B_6$ 130° C.; $n_D^{25}$ 1.5090.
27. Cycloheptylphenylmethane: $B_3$ 110°–113° C.; $n_D^{25}$ 1.5218.

Anal. Calc'd. for $C_{14}H_{20}$: C, 89.3; H, 10.7%.
Found: C, 88.6; H, 10.4%.

28. 1-Adamantylphenylmethane: $B_{0.2}$ 118°–120° C; $n_D^{25}$ 1.5563; m. 37°–41° C.

Calc'd. for $C_{17}H_{22}$: C, 90.2; H, 9.8 percent.
Found: C, 89.5; H, 9.5 percent.

29. 2-[2.2.2]-Bicyclooctylphenylmethane.
30. 1-[3.2.1]-Bicyclooctylphenylmethane.
31. 2-[3.3.1]-Bicyclononylphenylmethane.
32. 1-Homoadamantylphenylmethane.
33. 2-[3.2.0]-Bicycloheptylphenylmethane.

EXAMPLE 34

A solution of cyclobutylphenylmethane (20.5 g.; 0.14 mole) and acetyl chloride (12.5 g.; 0.16 mole) in 400 ml. of hexane is cooled to 0° C. and aluminum chloride (21.5 g; 0.16 mole) is added all at once. The reaction equipment is similar to that given in Example 14. The stirring mixture is warmed to about 5° C., an held there for one-half hour. The slurry is then warmed to room temperature for one hour, and finally refluxed for 30 minutes. Water is then carefully added to decompose the aluminum chloride. Sufficient water is finally added to dissolve all the solids and obtain two liquid phases. The mixture is transferred to a separatory funnel, and the hexane solution is isolated. The aqueous phase is washed with 100 ml. of hexane, and then discarded. The combined hexane fractions are washed sequentially with 100 ml. of 5 percent aqueous sodium hydroxide solution and 100 ml. of water. The hexane solution is dried with magnesium sulfate, filtered and evaporated in vacuum. The residual oil is distilled at 108° C. at 1 mm. of Hg to give 4'-cyclobutylmethylacetophenone ($n_D^{25}$ 1.5388).

Anal. Calc'd. for $C_{13}H_{16}O$: C, 82.9; H, 8.6 percent.
Found: C, 83.1; H, 8.5 percent.

The pertinent features in the infra-red spectrum are a very strong peak at 1,680 cm$^{-1}$ (carbonyl) and a peak at 850 cm$^{-1}$ indicative of two adjacent benzenoid hydrogens thus showing that the benzene ring has substituents in the 1 and 4 positions.

A gas-liquid chromatogram obtained on an F & M Model 500 Gas Chromatograph using a 2 foot × ¼ inch O.D. Stainless steel column packed with 10 percent Carbowax 20M ON 60–80 mesh Diatoport T with a helium flow rate of 60cc/min., a block temperature of 307° C., an injection port temperature of 262° C., and a column temperature of 225° C. shows that the sample consists of 98 percent of the 1,4-isomer and 2 percent of the 1,2-isomer which have retention times of 9.5 and 8.0 minutes respectively.

EXAMPLES 35 – 47

The following acetophenone derivatives are prepared according to the procedure given for 4'-cyclobutylmethylacetophenone in Example 34 by substituting a like molar amount of the appropriate alkylphenylmethane derivative for the cyclobutylphenylmethane of Example 34. The infra-red spectra for all these compounds are similar to that reported for 4'-cyclobutylmethylacetophenone in Example 34.

35. 4'-Cyclopentylmethylacetophenone: $B_{0.5}$ 130°–132° C.; $n_D{25}$ 1.5394.

Calc'd. for $C_{14}H_{18}O$: C, 83.2; H, 8.9%.
Found: C, 83.5; H, 8.9%.

Gas-liquid chromatography under conditions like those in Example 34 at a column temperature of 200° C. gives peaks at 14.0 minutes (2 percent of sample) for the 1,2-isomer at 17.5 minutes (98 percent of sample) for the 1,4-isomer.

36. 4'-Cyclohexylmethylacetophenone.
37. 4'-(3-Cyclopentylpropyl)acetophenone: $B_{0.5}$ 154° C.; $n_D^{25}$ 1.5298.

Anal. Calc'd. for $16H_{22}O$: C, 83.5; H, 9.6%.
Found: C, 83.5; H, 9.6%.

38. 4'-Cycloheptylmethylacetophenone: $B_{0.2}$ 136°–150° C.; $n_D^{25}$ 1.5426.

Anal. Calc'd. for $C_{16}H_{22}O$: C, 83.4; H, 9.6%.
Found: C, 83.6; H, 9.7%.

39. 4'-Cyclononylmethylacetophenone.
40. 4'-Cyclooctylmethylacetophenone.
41. 4'-(2-[2.2.1]-Bicycloheptylmethyl)acetophenone: $B_{0.3}$ 117° C.; $n_D^{25}$ 1.5511.

Anal. Calc'd. for $C16H20O$; C, 84.2; H, 8.8%.
Found: C, 84.1; H, 8.8%.

Gas-liquid chromatography under conditions like those given in Example 34 gives a single peak with a retention time of 29.5 minutes.

42. 4'-(1-Adamantylmethyl)acetophenone.
43. 4'-(2-[2.2.2]-Bicyclooctylmethyl)acetophenone.
44. 4'-(1-[3.2.1]-Bicyclooctylmethyl)acetophenone.
45. 4'-(2-[3.3.1]-Bicyclononylmethyl)acetophenone.
46. 4'-(1-Homoadamantylmethyl)acetophenone.
47. 4'-(2-[3.2.0]-Bicycloheptylmethyl)acetophenone.

EXAMPLE 48

A solution of 4'-cyclobutylmethylacetophenone (20 g.; 0.11 mole) in 225 ml. of methanol is cooled to less than 5° C., and 275 ml. of a 1.29M sodium hypochlorite solution (0.35 moles) is slowly added. The temperature is held below 5° C. during the addition. The sodium hypochlorite solution is conveniently prepared according to the procedure given by M. S. Newman, Organic Synthesis, Collective Volume II, John Wiley and Sons, New York, 1943, p. 429. After about 25 ml. of the hypochlorite solution is added, a white precipitate forms. When all of the hypochlorite solution is added, the stirring mixture is allowed to warm to room temperature, and left standing over night. Some chloroform usually separates during the night. The stirring mixture is heated to reflux (80° C.) and distillate (200 ml.) is collected until the pot temperature rises above 95° C. The pot concentrate is cooled to room temperature, and sulfur dioxide is bubbled into it until the pH falls below 3. The precipitate is extracted with two-300 ml. portions of dichloromethane, and the aqueous phase is discarded. The combined dichloromethane solutions are dried with magnesium sulfate, filtered and evaporated in vacuum. The yellow residue is triturated with cold pentane, and filtered. The 4-cyclobutylmethylbenzoic acid melts at 146°–149° C. and has an infra-red spectrum showing typical benzoic acid absorption peaks.

Anal. Calc'd. for $C_{12}H_{14}O_2$: C, 75.8: H, 7.4%
Found: C, 75.5; H, 7.6%.

Calc'd. neutral equivalent weight: 190.
Found: 198.

EXAMPLES 49 - 61

The following 4-alkylbenzoic acid derivatives are prepared according to the procedure given for 4-cyclobutylmethylbenzoic acid in Example 48 by substituting the appropriate 4'-alkylacetophenone in a like molar amount for the 4'-cyclobutylmethylacetophenone of Example 48. All of these compounds show the typical benzoic acid absorption peaks in their infra-red spectra.

49. 4-Cyclopentylmethylbenzoic acid: m. 143.0°-145.0° C.

Anal. Calc'd. for $C_{13}H_{16}O_2$: C, 76.5; H, 7.9%.
Found: C, 76.1; H, 7.5%.

50. 4-Cyclohexylmethylbenzoic acid.

51. 4-(3-Cyclopentylpropyl)benzoic acid: m. 117°-119° C.

Anal. Calc'd. for $C_{15}H_{20}O_2$: C, 77.5; H, 8.7%.
Found: C, 77.6; H, 8.7%.

52. 4-Cycloheptylmethylbenzoic acid: m. 171°-173° C.

Anal. Calc'd. for $C_{15}H_{20}O_2$: C, 77.5; H, 8.7%.
Found: C, 77.2; H, 8.7%.

53. 4-Cyclooctylmethylbenzoic acid.

54. 4-Cyclononylmethylbenzoic acid.

55. 4-(2-[2.2.1]-Bicycloheptylmethyl)benzoic acid: m. 171°-173° C.

Anal. Calc'd. for $C_{15}H_{18}O_2$: C, 78.3; H, 7.9%.
Found: C, 77.6; H, 7.9%.
Calc'd. neutral equivalent weight: 230.
Found: 243

56. 4-(1-Adamantylmethyl)benzoic acid.
57. 4-(2-[2.2.2]-Bicyclooctylmethyl)benzoic acid.
58. 4-(1-[3.2.1]-Bicyclooctylmethyl)benzoic acid.
59. 4-(2-[3.3.1]-Bicyclononylmethyl)benzoic acid.
60. 4-(1-Homoadamantylmethyl)benzoic acid.
61. 4-(2-[3.2.0]-Bicycloheptylmethyl)benzoic acid.

EXAMPLE 62

A sample of 4-cyclobutylmethylbenzoic acid (8.3 g.; 0.044 mole) is dissolved in 250 ml. of glacial acetic acid in a 500 ml. pressure bottle and platinum oxide (1 g.) is added. The mixture is then shaken under a hydrogen pressure of 45 p.s.i.g. on a Parr Hydrogenation Apparatus for 24 hours; the final pressure is 33 p.s.i.g. The catalyst is filtered, and the acetic acid removed in vacuum. The residual oil is taken up in 200 ml. of ether, and washed with two-100 ml. portions of water to remove the residual acetic acid. The ethereal solution is then dried with magnesium sulfate, filtered and evaporated in vacuum leaving an oil which subsequently crystallizes. The 4-cyclobutylmethylcyclohexane carboxylic acid is recrystallized from a mixture of ethanol and water, and melts from 59° to 69° C. The cis/trans mixture of carboxylic acids causes the broad melting range.

Anal. Calc'd. for $C_{12}H_{20}O_2$: C, 73.5; H, 10.2%
Found: C, 73.4; H, 10.2%.

The infra-red spectrum shows that the benzene ring has been reduced.

EXAMPLES 63 - 75

The following 4-alkylcyclohexane carboxylic acid derivatives are prepared according to the procedure given for 4-cyclobutylmethylcyclohexane carboxylic acid in Example 62 by substituting the appropriate 4-alkylbenzoic acid in a like molar amount for the 4-cyclobutylmethylbenzoic acid of Example 62. Infra-red spectra of these compounds will also show that the benzene rings have been reduced.

63. 4-Cyclopentylmethylcyclohexane carboxylic acid: $B_{0.4}$ 140° C.; $n_D^{25}$ 1.4910; m. 38°-47° C.

Anal. Calc'd. for $C_{13}H_{22}O_2$: C, 74.2; H, 10.5%.
Found: C, 73.9; H, 10.7%.

64. 4-Cyclohexylmethylcyclohexane carboxylic acid: m. 63°-69° C.

Anal. Calc'd. for $C_{14}H_{24}O_2$: C, 74.9; H. 10.8%.
Found: C, 75.2; H, 10.7%.

65. 4-(3-Cyclopentylpropyl)cyclohexanecarboxylic acid: $B_{0.6}$ 163° C.; $n_D^{25}$ 1.4872.

Anal. Calc'd. for $C_{15}H_{26}O_2$: C, 75.5; H. 11.0%.
Found: C, 75.4; H, 10.8%.

66. 4-Cycloheptylmethylcyclohexane carboxylic acid: m. 45°-49° C. $B_{0.5}$ 160°-162° C.; $n_D^{25}$ 1.4963;

Anal. Calc'd. for $C_{15}H_{26}O_2$: C, 75.5; H, 11.0%.
Found: C, 75.5; H, 10.8%. Neutral Equivalent: Calc'd: 238. Found: 238.

67. 4-Cyclooctylmethylcyclohexane carboxylic acid.
68. 4-Cyclononylmethylcyclohexane carboxylic acid.
69. 4-(2-[2.2.1]-Bicycloheptylmethyl)cyclohexane carboxylic acid: m. 64°-73° C. (from ethanol).

Anal. Calc'd. for $C_{15}H_{24}O_2$: C, 76.2; H, 10.2%.
Found: C, 76.1; H, 10.1%.

70. 4-(1-Adamantylmethyl)cyclohexane carboxylic acid.
71. 4-(2-[2.2.2]-Bicyclooctylmethyl)cyclohexane carboxylic acid.
72. 4-(1-[3.2.1]-Bicyclooctylmethyl)cyclohexane carboxylic acid.
73. 4-(2-[3.3.1]-Bicyclononylmethyl)cyclohexane carboxylic acid.
74. 4-(1-Homoadamantylmethyl)cyclohexane carboxylic acid.
75. 4-(2-[3.2.0]-Bicycloheptylmethyl)cyclohexane carboxylic acid.

EXAMPLE 76

A sample of 4-cyclopentylmethylcyclohexane carboxylic acid (13.1 g.; 0.062 mole) is taken up in a mixture of 75 ml. of chloroform and 65 ml. of concentrated sulfuric acid in a 250 ml. Erlenmeyer flask. Sodium azide (4.9 g.; 0.075 mole) is carefully added with a spatula at a rate to keep the temperature of the stirring mixture between 35° and 45° C. After completion of the sodium azide addition, the stirring mixture is heated at 45°-50° C. for two hours; the rate of gas evolution is very slow at this time. The mixture is transferred to a separating funnel and the lower, gelatinous sulfuric acid layer is slowly dripped into one liter of crushed ice. The 4-cyclopentylmethylcyclohexylamine hemi-sulfate crystallizes slowly. The salt is filtered and washed with water; it is almost completely insoluble in water. The melting point is above 300° C.

Anal. Calc'd. for $C_{12}H_{23}N.1/2H_2SO_4$: C, 62.6; H. 10.5; N, 6.1%.
Found: C, 62.0; H, 10.7; N, 6.0%.

The infra-red spectrum shows absorptions characteristic of amine salts and sulfates and has no absorption corresponding to a carboxyl function.

EXAMPLES 77 – 89

The following 4-cycloalkylalkylcyclohexylamine derivatives or their salts are prepared according to the procedure given for 4-cyclopentylmethylcyclohexylamine hemisulfate in Example 76 by substituting the appropriate 4-cycloaklylalkylcyclohexane carboxylic acid in like molar amounts for the 4-cyclopentylmethylcyclohexane carboxylic acid of Example 76. In those instances where the free amines are prepared, the amine salt is dissolved in 10 percent aqueous sodium hydroxide solution, and the free amine is extracted with dichloromethane. The dichloromethane solution is dried with magnesium sulfate, filtered and evaporated in vacuum. The residual oil is distilled in vacuum through a spinning band column. The infra-red spectra of these compounds all show the loss of the carbonyl function and the presence of an amino function.

77. 4-Cyclobutylmethylcyclohexylamine.
78. 4-cis-Cyclohexylmethylcyclohexylamine hemisulfate: m. > 300° C.

Anal. Calc'd. for $C_{13}H_{25}N.1/2H_2SO_4$: C, 64.0; H, 10.8; S, 6.6%.

Found: C, 63.9; H, 10.6; S. 6.9%.

79. 4-(3-Cyclopentylpropyl)cyclohexylamine sulfate: m.>300° C.
80. 4-Cycloheptylmethylcyclohexylamine hemisulfate: m.>300° C.
81. 4-Cyclooctylmethylcyclohexylamine hemisulfate: m.>300° C.
82. 4-Cyclononylmethylcyclohexylamine hemisulfate: m.>300° C.
83. 4-(2-[2.2.1]-Bicycloheptylmethyl)cyclohexylamine hemisulfate dihydrate: m. > 300° C.

Calc'd. for $C_{14}H_{25}N.1/2H_2SO_4.2H_2O$: C, 57.9; H, 9.7; N, 4.8%.

Found: C, 58.5; H, 9.3; N, 4.7%.

84. 4-(1-Adamantylmethyl)cyclohexylamine sulfate: m.>300° C.
85. 4-(2-[2.2.2]-Bicyclooctylmethyl)cyclohexylamine sulfate: m. > 300° C.
86. 4-(1-[3.2.1]-Bicyclooctylmethyl)cyclohexylamine sulfate: m. > 300° C.
87. 4-(2-[3.3.1]-Bicyclononylmethyl)cyclohexylamine hemisulfate: m.>300° C.
88. 4-(1-Homoadamantylmethyl)cyclohexylamine sulfate: m.>300° C.
89. 4-(2-[3.2.1]-Bicycloheptylmethyl)cyclohexylamine hemisulfate: m. > 300° C.

EXAMPLE 90

A sample of 4-cyclopentylmethylcyclohexylamine hemi-sulfate (6 g.; 0.026 mole) is stirred for 10 minutes in a mixture consisting of 15 ml. of dimethylacetamide and 15 ml. of 20 percent aqueous sodium hydrochloride solution. Acetic anhydride (15 ml.) is added with stirring; the temperature rises to 75°–80° C. After the temperature has dropped to about 60° C., the milky suspension is filtered to remove any traces of unreacted 4-cyclopentylmethylcyclohexylamine hemisulfate. The milky filtrate is poured into 800 ml. of water, and the oil which separates crystallizes. The crystalline N-acetyl-4-cyclopentylmethylcyclohexylamine is filtered and washed with water. It melts from 65° to 78° C.

Calc'd. for $C_{14}H_{27}NO$: C, 75.4; H, 11.2; N, 6.2%.

Found: C, 75.2; H, 11.4; N, 6.2%.

Gas-liquid chromatography on an F & M Model 500 Gas Chromatograph using a 2 feet × one-quarter inch O.D. stainless steel column packed with 10 percent Carbowax 20M on 60–80 mesh Diatoport T at a column temperature of 225° C., a block temperature of 308° C., an injection port temperature of 265° C. and a helium flow rate of 60 cc./min. shows that the sample consists of two compounds present to the extent of 74 and 26 percent which have retention times of 33.0 and 37.0 minutes respectively.

N-Acetyl-4-cyclopentylmethylcyclohexylamine is used to treat mice according to the procedures given in Example 1 with like results.

EXAMPLES 91 – 104

The following N-acyl-4-alkylcyclohexylamines are prepared according to the procedure given for N-acetyl-4-cyclopentylmethylcyclohexylamine in Example 90 by substituting in like molar amount the appropriate 4-cycloalkylalkylcyclohexylamine and acid anhydride for the 4-cyclopentylmethylcyclohexylamine and acetic anhydride of Example 90.

91. N-Propionyl-4-cyclopentylmethylcyclohexylamine.
92. N-Acetyl-4-cyclobutylmethylcyclohexylamine: m. 42°–59° C.

$$\text{cis/trans ratio} = \frac{78(43.5 \text{ min.})}{22(49.6 \text{ min.})}$$

by G.L.C. method similar to that in Example 90 at a column temperature of 200° C.

Calc'd. for $C_{13}H_{23}NO$: C, 74.7; H, 11.1; N, 6.7%.

Found: C, 74.7; H, 11.1; N, 6.5%.

93. N-Acetyl-4-(3-cyclopentylpropyl)cyclohexylamine: m. 68°–82° C.

$$\text{cis/trans ratio} = \frac{76(50.5 \text{ min.})}{24(58.0 \text{ min.})}$$

by G.L.C. method similar to that in Example 90 at a column temperature of 225° C.

Calc'd. for $C_{16}H_{29}NO$: C, 76.5; H, 11.6; N, 5.6%.

Found: C, 76.2; H, 11.5; N, 5.5%.

94. N-Butyryl-4-(3-cyclopentylpropyl)cyclohexylamine.
95. N-Acetyl-4-cycloheptylmethylcyclohexylamine: m. 64°–76° C.

$$\text{cis/trans ratio} = \frac{72(44.0 \text{ min.})}{28(49.5 \text{ min.})}$$

by G.L.C. method similar to that in Example 90 at a column temperature of 230° C.

96. N-Acetyl-4-cyclooctylmethylcyclohexylamine.
97. N-Acetyl-4-cyclononylmethylcyclohexylamine.
98. N-Acetyl-4-(2-[2.2.1]-bicycloheptylmethyl)cyclohexylamine. m. 111°–113° C.

$$\text{cis/trans ratio} = \frac{73(55.8 \text{ min.})}{27(63.5 \text{ min.})}$$

by G.L.C. method like that in Example 90 at a column temperature of 225° C.

Calc'd. for $C_{16}H_{27}NO$: C, 77.2; H, 10.9; N, 5.6%.

Found: C, 76.9; H, 10.7; N, 5.6%.

99. N-Acetyl-4-(1-adamantylmethyl)cyclohexylamine.
100. N-Acetyl-4-(2-[2.2.2]-bicyclooctylmethyl)cyclohexylamine.

101. N-Acetyl-4-(2-[3.2.1]-bicyclooctylmethyl)cyclohexylamine.
102. N-Acetyl-4-(2-[3.3.1]-bicyclononylmethyl)cyclohexylamine.
103. N-Acetyl-4-(1-homoadamantylmethyl)cyclohexylamine.
104. N-Acetyl-4-(2-[3.2.0]-bicycloheptylmethyl)cyclohexylamine.

EXAMPLE 105

A sample of 4-cyclobutylmethylcyclohexylamine (10 g.; 0.060 mole) is refluxed for three hours with 20 ml. of methylformate. The solution is then evaporated in vacuum and the residual N-formyl-4-cyclobutylmethyl-cyclohexylamine is purified by recrystallization from hexane. This N-formyl-4-cyclobutylmethylcyclohexylmaine is used to treat mice according to the procedures given in Example 1 with like results.

EXAMPLES 106 – 109

The following N-formyl-4-cycloalkylalkylcyclohexylamine derivatives are prepared according to the procedures used for N-formyl-4-cyclobutylmethylcyclohexylamine in Example 105 by substituting in like molar amounts the appropriate 4-cycloalkylalkylcyclohexylamine for the 4-cyclobutylmethylcyclohexylamine of Example 105.

106. N-Formyl-4-cyclononylmethylcyclohexylamine.
107. N-Formyl-4-(2-[2.2.1]-bicycloheptylmethyl)cyclohexylamine.
108. N-Formyl-4-(1-adamantylmethyl)cyclohexylamine.
109. N-Formyl-4-cyclohexylmethylcyclohexylamine: m. 60°–80° C.

$$\text{cis/trans ratio} = \frac{96(54.6 \text{ min.})}{4(59.5 \text{ min.})}$$

G.L.C. conditions similar to that in Example 90 except that block temp. is 340° C., injection port temp. is 285° C., and column temp. is 230° C.
Anal. Calc'd. for $C_{14}H_{25}NO$: C, 75.3; H, 11.3; N, 6.3%.
Found: C, 75.4; H, 11.3; N, 6.3%.

EXAMPLE 110

A mixture of N-formyl-4-cyclohexylmethylcyclohexylamine (7.9 g.; 0.035 mole) and lithium aluminum hydride (LAH) (3.8g.; 0.10 mole) is heated in 100 ml. of refluxing ether for 24 hours. The suspension is cooled, and the lithium aluminum hydride is decomposed using wet ether and then a saturated, aqueous solution of sodium sulfate. This decomposition should be performed cautiously to avoid a fire. The precipitated salts are filtered and washed with ether. The ethereal solution is then dried with magnesium sulfate, filtered and evaporated in vacuum leaving an oil. The infra-red spectrum shows the oil to be an amine. The N-methyl-N-cyclohexylmethylcyclohexylamine is purified by vacuum distillation.

EXAMPLES 111 – 119

The following dialkylamines are prepared according to the procedure described for N-methyl-N-cyclohexylmethylcyclohexylamine in Example 110 by substituting in like molar amounts of the appropriate N-formyl- or N-acetyl-4-cycloalkylalkylcyclohexylamine for the N-formyl-N-cyclohexylmethylcyclohexylamine in Example 110.

111. N-Methyl-N-(4-cyclobutylmethylcyclohexyl)amine.
112. N-Methyl-N-[4-(3-cyclopentylpropyl)cyclohexyl]amine.
113. N-Ethyl-N-[4-(2-[2.2.1]-bicycloheptylmethyl)cyclohexyl]-amine.
114. N-Methyl-N-(4-cyclopentylmethylcyclohexyl)amine.
115. N-Methyl-N-(4-cycloheptylmethylcyclohexyl)amine.
116. N-Methyl-N-[4-(2-[3.3.1]-bicyclononylmethyl)cyclohexyl]-amine.
117. N-Methyl-N-(4-[1-adamantylmethyl]cyclohexyl)amine.
118. N-Ethyl-N-(4-[1-adamantylmethyl]cyclohexyl)amine.
119. N-Methyl-N-(4-[1-homoadamantylmethyl]cyclohexyl)amine.

EXAMPLES 120 - 127

The following N-acyl-N-methyl or ethyl-N-4cycloalkylcyclohexylamine derivatives are prepared according to the directions given for preparing N-acetyl-4-cyclopentylmethylcyclohexylamine in Example 90 or N-formyl-4-cyclobutylmethylcyclohexylamine in Example 105 by substituting the obvious reactants in like molar amounts for those given in Examples 90 and 105.

120. N-Acetyl-N-methyl-N-(4-cyclononylmethylcyclohexyl)amine.
121. N-Formyl-N-ethyl-N-(4-cyclopentylmethylcyclohexyl)amine.
122. N-Propionyl-N-methyl-N-(4-cycloheptylmethylcyclohexyl)amine.
123. N-Butanoyl-N-methyl-N-(4-cyclobutylmethylcyclohexyl)amine.
124. N-Formyl-N-methyl-N-[4-(2-[2.2.1]-bicycloheptylmethyl)-cyclohexyl]amine.
125. N-Acetyl-N-ethyl-N-[4-(1-adamantylmethyl)cyclohexyl]amine.
126. N-Acetyl-N-methyl-N-[4-(1-homoadamantylmethyl)cyclohexyl]-amine.
127. N-Acetyl-N-methyl-N-[4-(2-[3.3.1]-bicyclononylmethyl)-cyclohexyl]amine.

EXAMPLE 128

Dogs are exposed to vapors from N-acetyl-4-cyclobutylmethylcyclohexylamine in acetone spotted on a 6 cm. circle of filter paper. The dog's head is held by an operator, and the dried paper is held 6 to 12 cm. from the muzzle. Within 10–30 seconds, the dog salivates, licks his lips, and occasionally face-paws. Generally, he struggles to escape further irritant effects. As little as 2 milligrams on paper can generate enough vapor at room temperature to cause visible discomfort in most dogs.

EXAMPLES 129 – 133

Dogs exposed to as little as two milligrams of vapor from the following compounds according to the procedures given in Example 128 exhibit visible discomfort similar to that produced by N-acetyl-4-cyclobutylmethylcyclohexylamine in Example 128.

129. N-Formyl-N-4-cyclopentylmethylcyclohexylamine.
130. N-Butanoyl-N-4cyclopentylmethylcyclohexylamine.
131. N-Acetyl-N-4-(2-[2.2.1]-bicycloheptylmethyl)cyclohexylamine.
132. N-Acetyl-N-4-cyclononylmethylcyclohexylamine.
133. N-Acetyl-N-4-(1-adamantylmethyl)cyclohexylamine.

EXAMPLE 134

A 2 percent solution of N-acetyl-4-cyclohexylmethylcyclohexylamine in dichloromethane is dispersed into and through a chamber containing the test animals described below. This aerosol is generated by feeding the solution of test compound through a commercial paint sprayer jet at a rate of 10 ml./minute and dispersing the spray with a stream of air having a flow rate of 44 liters/minute supplied at a pressure of 62 psi. The efficiency of forming respirable particles ranges from 10 to 40 percent. This aerosol gives a chamber concentration of 2.1 mg./liter; the particles have a mass median diameter of 1.6 microns with a standard geometric deviation of 2.0 microns.

After having been exposed to this aerosol for one minute young, adult, male guinea pigs weighing from 250–300 grams display salivation for one hour and in some instances prostration for 20 to 60 minutes.

After rats weighing about 200 g. are exposed to this aerosol for one minute, lacrimation is observed which lasts for about 30 minutes.

After gerbils are exposed to this aerosol for 1 minute, shovelnosing is observed which lasts for about 30 minutes. Shovelnosing is a type of behavior exhibited by the animal in which the animal runs around the cage rubbing the side of its face against the floor with a wiping motion.

EXAMPLE 135

The following test is used to compare the difference in effects in mice of the cis and trans isomers of N-acetyl-4-cyclohexylmethylcyclohexylamine.

Groups made up of four West Jersey White Mice weighing 18 to 24 grams and being about 5 weeks old are exposed to dosages of the cis isomer and the trans isomer.

The following $EC_{t50}$ levels were obtained using the statistical methods of Litchfield and Wilcoxon on data obtained at dose levels ranging from 100 to 100,000 $C_t$.

| Group | $EC_{t50}$ | cis |
|---|---|---|
| 1. | 562 | Hyperemia |
| 2. | 1780 | Ptosis |
| 3. | 5620 | Decreased locomotor activity Dyspnea Abnormal gait |
| 4. | 10,000 | Lacrimation |
| 5. | 17,000 | Continuation of all of the above |
|  |  | trans |
| 6. | 562 | No symptoms |
| 7. | 1780 | No symptoms |
| 8. | 5620 | No symptoms |
| 9. | 10,000 | No symptoms |
| 10. | 17,000 | Decreased locomotor activity |

The column showing effects indicates the calculated effective dose on fifty-percent of the subjects. ($EC_{t50}$). $C_t$ refers to the concentration of the indicated compound in micrograms per liter of air per minute of exposure. The dosage column shows in each instance the calculated cumulative dose after five minutes exposure.

There is a 10 to 30 fold difference in effective $C_{t50}$ favoring the cis isomer over the trans isomer.

We claim:
1. Method of repelling animals comprising applying to an area to be protected from animals in an amount sufficient to cause irritation to animal tissue, a compound of the formula:

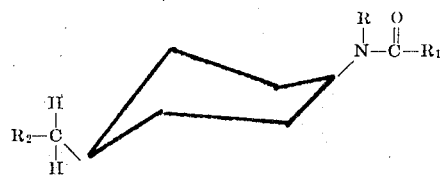

wherein
R is selected from the group consisting of hydrogen and alkyl of 1 through two carbon atoms;
$R_1$ is selected from the group consisting of hydrogen and alkyl of one through four carbon atoms;
$R_2$ is selected from the group consisting of cyclobutyl, cyclopentyl, cyclohexyl, cycloheptyl, cyclooctyl, cyclononyl, bicycloalkyl of seven through 10 carbon atoms, cycloalkylalkyl of five through 10 carbon atoms, and tricycloalkyl of 10 through 11 carbon atoms; with the limitation that $R_2$ and the amide must be in the cis configuration of the cyclohexane ring.

2. Method of repelling animals comprising applying to an area to be protected from animals in an amount sufficient to cause irritation to animal tissue, N-formyl-cis-4-cyclohexylmethylcyclohexylamine.

3. Method of repelling animals comprising applying to an area to be protected from animals in an amount sufficient to cause irritation to animal tissue, N-acetyl-cis-4-cyclohexylmethylcyclohexylamine.

4. Method of repelling animals comprising applying to an area to be protected from animals in an amount sufficient to cause irritation to animal tissue, N-acetyl-cis-4-cyclobutylmethylcyclohexylamine.

5. Method of repelling animals comprising applying to an area to be protected from animals in an amount sufficient to cause irritation to animal tissue, N-acetyl-cis-4-(2-[2.2.1]-bicycloheptylmethyl)cyclohexylamine 6. Method according to claim 1 wherein R in the compound applied is hydrogen.

7. Method according to claim 1 wherein $R_1$ in the compound applied is hydrogen.

8. Method according to claim 1 wherein $R_2$ in the compound applies is cyclohexyl.

9. Method according to claim 1 wherein $R_1$ in the compound applied is methyl.

10. Method according to claim 1 wherein $R_1$ in the compound applied is n-propyl.

* * * * *